(12) United States Patent
Obiya et al.

(10) Patent No.: US 11,239,889 B2
(45) Date of Patent: Feb. 1, 2022

(54) RADIO-FREQUENCY CIRCUIT AND COMMUNICATION DEVICE

(71) Applicant: MURATA MANUFACTURING CO., LTD., Kyoto (JP)

(72) Inventors: Hidenori Obiya, Nagaokakyo (JP); Hirotsugu Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/019,901

(22) Filed: Sep. 14, 2020

(65) Prior Publication Data

US 2021/0091832 A1  Mar. 25, 2021

(30) Foreign Application Priority Data

Sep. 19, 2019  (JP) .............................. JP2019-170132

(51) Int. Cl.
*H04B 1/00*  (2006.01)
*H04B 7/06*  (2006.01)
(Continued)

(52) U.S. Cl.
CPC ......... *H04B 7/0602* (2013.01); *H04B 1/0064* (2013.01); *H04B 2001/0408* (2013.01); *H04W 88/06* (2013.01)

(58) Field of Classification Search
CPC .... H03F 3/19; H03F 3/24; H04B 1/00; H04B 1/04; H04B 1/18; H04B 1/44; H04B 1/48;
(Continued)

(56) References Cited

U.S. PATENT DOCUMENTS 9,172,441 B2 * 10/2015 Granger-Jones ....... H04B 1/006
9,391,666 B1    7/2016 Handtmann et al.
(Continued)

FOREIGN PATENT DOCUMENTS

JP  2015139005 A   7/2015
JP  2017017691 A   1/2017
WO 2016208670 A1  12/2016

OTHER PUBLICATIONS

ZTE Corporation, Discussion on LTE anchor agnostic approach for EN-DC, 3GPP TSG-RAN WG4 Meeting 90bis, Apr. 8-Apr. 12, 2019, pp. 1-4, R4-1903152, ZTE Corporation, Xian, China.

*Primary Examiner* — Shawkat M Ali
(74) *Attorney, Agent, or Firm* — Pearne & Gordon LLP

(57) ABSTRACT

A radio-frequency circuit includes: a first transfer circuit that outputs a B1 or B3 first transmission signal amplified by a first power amplifier from a first input/output terminal; a second transfer circuit that outputs an n77 or n79 second transmission signal amplified by a second power amplifier from a second input/output terminal; and a switch. When a B1 first transmission signal and an n77 second transmission signal are simultaneously transmitted, the switch connects the first transfer circuit to a first antenna and connects the second transfer circuit to a second antenna since intermodulation distortion IMD2 overlaps with B1. When a B3 first transmission signal and an n79 second transmission signal are simultaneously transmitted, the switch connects both of the first transfer circuit and the second transfer circuit to the first antenna since intermodulation distortion IMD2 does not overlap with B3.

18 Claims, 6 Drawing Sheets

(51) Int. Cl.
*H04B 1/04* (2006.01)
*H04W 88/06* (2009.01)

(58) Field of Classification Search
CPC .......... H04B 1/58; H04B 1/0064; H04B 7/04; H04B 7/06; H04B 7/08; H04B 7/0602; H04B 7/0686; H04B 15/00; H04L 5/00; H04L 5/08; H04L 5/14; H04L 27/00; H04W 24/02; H04W 52/52; H04W 52/286; H04W 72/04; H04W 88/06
USPC ........ 370/252, 278, 297, 329; 375/219, 260, 375/267, 295, 296; 455/63.1, 73, 77, 87, 455/107, 280, 552
See application file for complete search history.

(56) References Cited

U.S. PATENT DOCUMENTS

| | | | |
|---|---|---|---|
| 9,484,961 B2 * | 11/2016 | Lum | H04B 1/0067 |
| 10,075,199 B2 * | 9/2018 | King | H04L 5/001 |
| 10,116,339 B2 * | 10/2018 | Anthony | H04W 52/346 |
| 10,193,530 B2 | 1/2019 | Takamine | |
| 10,498,521 B2 * | 12/2019 | Little | H04L 5/1461 |
| 10,560,139 B2 * | 2/2020 | Brunel | H04B 1/0064 |
| 2013/0308477 A1 * | 11/2013 | He | H04W 36/14 |
| | | | 370/252 |
| 2017/0048028 A1 | 2/2017 | Pehlke et al. | |
| 2017/0195004 A1 * | 7/2017 | Cheng | H04B 7/0602 |
| 2019/0288734 A1 * | 9/2019 | Bai | H04B 7/0404 |

* cited by examiner

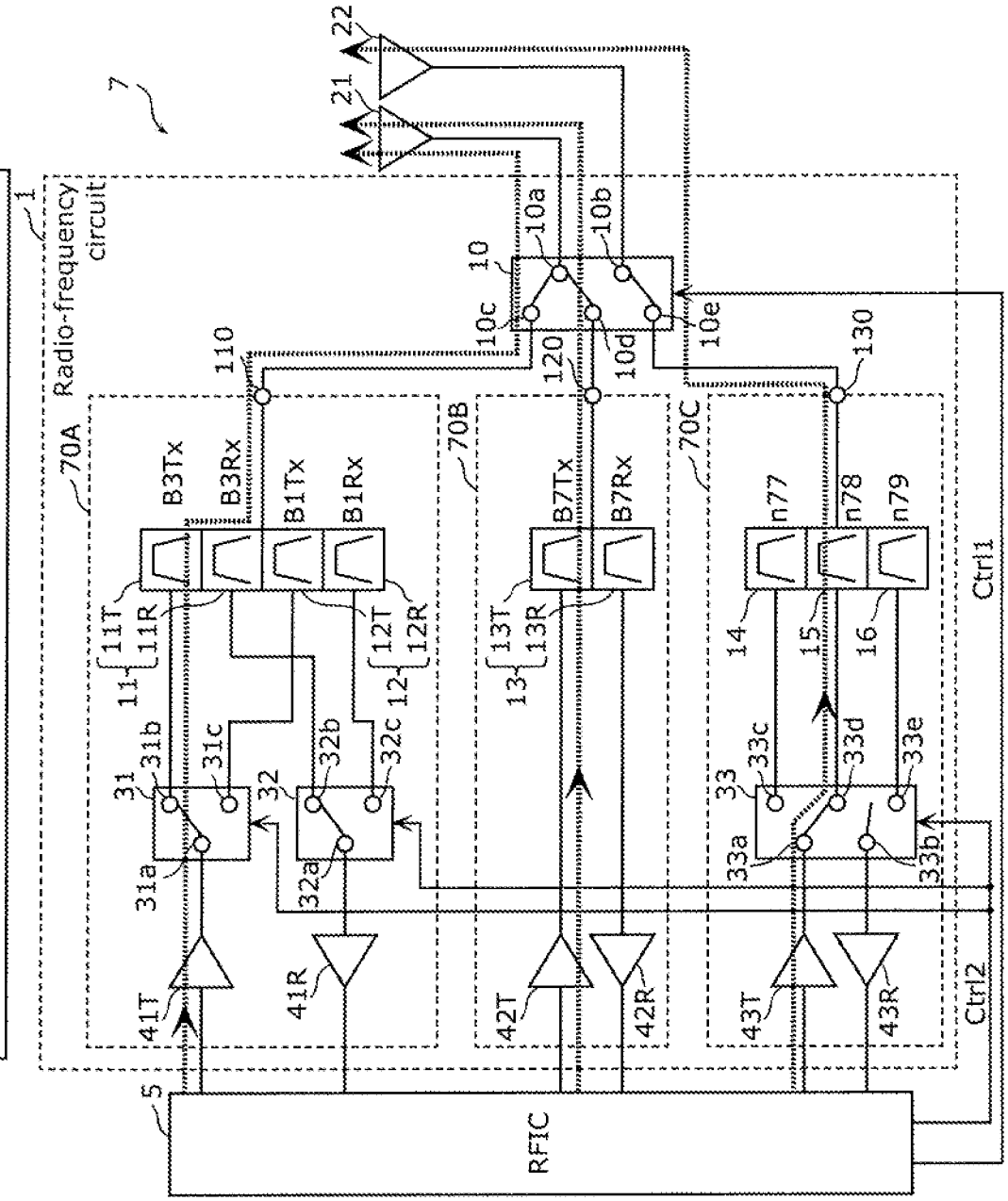

RADIO-FREQUENCY CIRCUIT AND COMMUNICATION DEVICE

CROSS REFERENCE TO RELATED APPLICATION

The present application is based on and claims priority of Japanese Patent Application No. 2019-170132 filed on Sep. 19, 2019. The entire disclosure of the above-identified application, including the specification, drawings and claims is incorporated herein by reference in its entirety.

TECHNICAL FIELD

The present disclosure relates to a communication device and a radio-frequency circuit that process radio-frequency signals.

BACKGROUND

A method of simultaneously using different frequency bands (communication bands) should be applied to multi-band/multimode-compatible radio-frequency front-end modules.

Japanese Unexamined Patent Application Publication No. 2017-17691 (PTL 1) (e.g., its FIG. 2B) discloses a circuit configuration of an electronic system (a radio-frequency front-end module) having a first transmission circuit and a second transmission circuit. Specifically, the first transmission circuit includes: a first power amplifier that amplifies a radio-frequency signal of one frequency domain (a first frequency band group); a first antenna switch; a first band selector switch disposed on a first signal path connecting the first power amplifier and the first antenna switch; and first filters (duplexers) connected to the first band selector switch. The second transmission circuit includes: a second power amplifier that amplifies a radio-frequency signal of another frequency domain (a second frequency band group); a second antenna switch; a second band selector switch disposed on a second signal path connecting the second power amplifier and the second antenna switch; and second filters (duplexers) connected to the second band selector switch. This enables simultaneous transmission of a first radio-frequency transmission signal outputted from the first transmission circuit and a second radio-frequency transmission signal outputted from the second transmission circuit.

BRIEF SUMMARY

A problem, however, is that when the simultaneous transmission of the first radio-frequency transmission signal and the second radio-frequency transmission signal is performed, the second radio-frequency transmission signal outputted from the second power amplifier is superimposed on the first radio-frequency transmission signal that is outputted from the first power amplifier and propagating in the first signal path, intermodulation distortion is generated between the first radio-frequency transmission signal and the second radio-frequency transmission signal, and this causes radio-frequency signal quality to deteriorate. Another problem is that when the frequency of a second harmonic of the first radio-frequency transmission signal or the second radio-frequency transmission signal is included in the frequency band of a reception circuit included in the radio-frequency front-end module, the second harmonic enters the reception circuit, and this causes the reception sensitivity of the reception circuit to deteriorate.

In view of the above, the present disclosure is to provide a radio-frequency circuit and a communication device which reduce the generation of intermodulation distortion due to the simultaneous transmission of radio-frequency signals having different frequencies or reduce the deterioration of reception sensitivity due to the transmission of radio-frequency signals.

A radio-frequency circuit according to one aspect of the present disclosure includes: a first transfer circuit that includes a first transmission power amplifier and is configured to output a first transmission signal amplified by the first transmission power amplifier from a first input/output terminal, the first transmission power amplifier being configured to amplify a transmission signal of a first communication band; a second transfer circuit that includes a second transmission power amplifier and is configured to output a second transmission signal amplified by the second transmission power amplifier from a second input/output terminal, the second transmission power amplifier being configured to amplify a transmission signal of a second communication band having a frequency range that does not overlap a frequency range of the first communication band; and a switch circuit including a first antenna connector terminal connected to a first antenna, a second antenna connector terminal connected to a second antenna different from the first antenna, a first selector terminal connected to the first input/output terminal, and a second selector terminal connected to the second input/output terminal. When a frequency of intermodulation distortion in simultaneous transmission of the first transmission signal and the second transmission signal is included in at least one of the first communication band or the second communication band, the switch circuit is configured to connect the first selector terminal to the first antenna connector terminal and connect the second selector terminal to the second antenna connector terminal. When the frequency of the intermodulation distortion is not included in either of the first communication band and the second communication band, the switch circuit is configured to connect both of the first selector terminal and the second selector terminal to one of the first antenna connector terminal or the second antenna connector terminal.

The present disclosure can provide a radio-frequency circuit and a communication device which reduce the generation of intermodulation distortion when a plurality of radio-frequency signals having different frequencies are being simultaneously transmitted.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 6 is an example of a circuit diagram illustrating a state of signal transfer of a radio-frequency circuit according to Implemental Example 4.

DETAILED DESCRIPTION OF EMBODIMENTS

Figure 1:
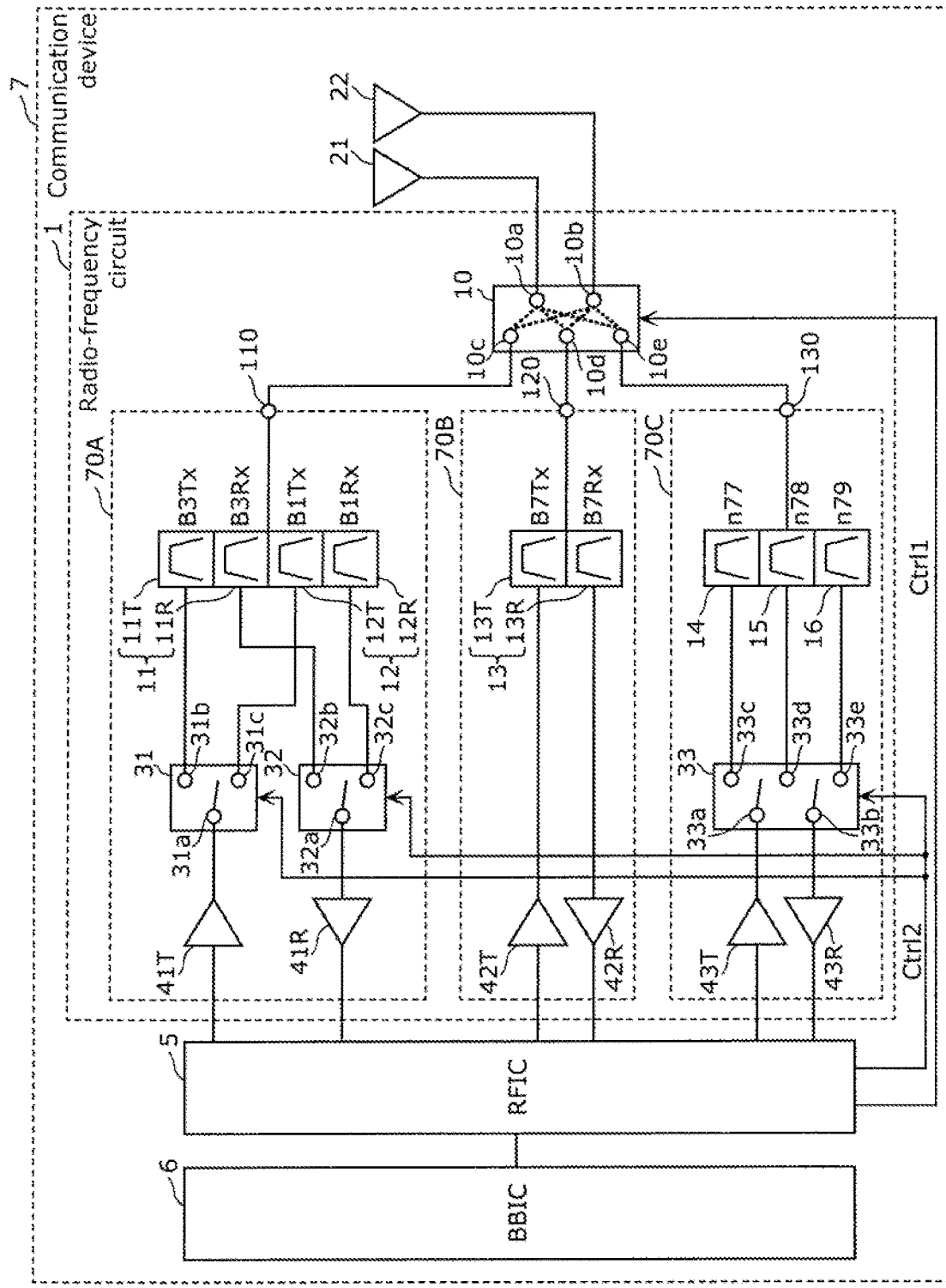
FIG. 1 is an example of a circuit configuration diagram of a radio-frequency circuit and a communication device according to an embodiment.

Hereinafter, exemplary embodiments of the present disclosure will be described in detail with reference to the drawings. It should be noted that each of the subsequently described exemplary embodiments show a generic or specific example. The numerical values, shapes, materials, elements, the arrangement and connection of the elements, etc. indicated in the following exemplary embodiments are mere examples, and therefore are not intended to limit the present disclosure. Among the elements described in the following exemplary embodiments, elements not recited in any one of the independent claims are described as optional elements. In addition, the sizes of the elements and the ratio of the sizes illustrated in the drawings are not necessarily accurate.

Embodiment

1. Configuration of Radio-Frequency Circuit 1 and Communication Device 7

FIG. 1 is an example of a circuit configuration diagram of radio-frequency circuit 1 and communication device 7 according to the embodiment. As illustrated in the figure, communication device 7 includes radio-frequency circuit 1, antennas 21 and 22, RF signal processing circuit (RFIC) 5, and baseband signal processing circuit (BBIC) 6.

Radio-frequency circuit 1 includes transfer circuits 70A, 70B, and 70C, and switch 10.

Transfer circuit 70A is one example of the first transfer circuit and transfers radio-frequency signals of a first frequency band group. Transfer circuit 70B is one example of the first transfer circuit or the second transfer circuit and transfers radio-frequency signals of a second frequency band group. Transfer circuit 70C is one example of the second transfer circuit and transfers radio-frequency signals of a third frequency band group.

Each of the first frequency band group, the second frequency band group, and the third frequency band group is, for example, a different one of a low band group, a middle band group, a high band group, and an ultra-high band group.

The low band group is a frequency band group including a plurality of communication bands used in the fourth generation mobile communication system (4G) and the fifth generation mobile communication system (5G), and has a frequency range with the upper limit of 1 GHz, for example. The low band group includes communication bands, such as 4G-long term evolution (LTE: also referred to as Evolved-Universal Terrestrial Radio Access (E-UTRA)) Band 5 (a transmission band from 824 MHz to 849 MHz and a reception band from 869 MHz to 894 MHz), Band 8 (a transmission band from 880 MHz to 915 MHz and a reception band from 925 MHz to 960 MHz), and Band 28 (a transmission band from 703 MHz to 748 MHz and a reception band from 753 MHz to 803 MHz). It should be noted that 4G-LTE Band X is hereinafter sometimes simply referred to as "BX".

The middle band group is a frequency band group including a plurality of communication bands used in 4G and 5G, is located on a high-frequency side of the low band group, and has a frequency range from 1.5 GHz to 2.2 GHz, for example. The middle band group includes, for example, LTE Band 1 (a transmission band from 1920 MHz to 1980 MHz and a reception band from 2110 MHz to 2170 MHz), Band 3 (a transmission band from 1710 MHz to 1785 MHz and a reception band from 1805 MHz to 1880 MHz), and Band 66 (a transmission band from 1710 MHz to 1780 MHz and a reception band from 2110 MHz to 2200 MHz).

The high band group is a frequency band group including a plurality of communication bands used in 4G and 5G, is located on a high-frequency side of the middle band group, and has a frequency range of from 2.4 GHz to 2.8 GHz, for example. The high band group includes, for example, LTE Band 7 (a transmission band from 2500 MHz to 2570 MHz and a reception band from 2620 MHz to 2690 MHz), and Band 41 (a transmission/reception band from 2496 MHz to 2690 MHz).

The ultra-high band group is a frequency band group including a plurality of communication bands used in 4G and 5G, is located on a high-frequency side of the high band group, and has a frequency range with the lower limit of 3 GHz, for example. The ultra-high band group includes communication bands such as 5G-new radio (NR) n77 (a frequency band from 3300 MHz to 4200 MHz), n78 (a frequency band from 3300 MHz to 3800 MHz), and n79 (a frequency band from 4400 MHz to 5000 MHz). It should be noted that 5G-NR nY is hereinafter sometimes simply referred to as "nY".

In the present embodiment, the middle band group is applied as the first frequency band group, the high band group is applied as the second frequency band group, and the ultra-high band group is applied as the third frequency band group.

Transfer circuit 70A includes input/output terminal 110, duplexers 11 and 12, switches 31 and 32, power amplifier 41T, and low-noise amplifier 41R.

Duplexer 11 includes transmission filter 11T and reception filter 11R. Transmission filter 11T is a filter having, as a passband, the transmission band of B3 (a first communication band). Transmission filter 11T has an input terminal connected to selector terminal 31b of switch 31. Reception filter 11R is a filter having, as a passband, the reception band of B3 (a first communication band). Reception filter 11R has an output terminal connected to selector terminal 32b of switch 32. The output terminal of transmission filter 11T and the input terminal of reception filter 11R are commonly connected to input/output terminal 110.

Duplexer 12 includes transmission filter 12T and reception filter 12R. Transmission filter 12T is a filter having, as a passband, the transmission band of B1 (a first communication band). Transmission filter 12T has an input terminal connected to selector terminal 31c of switch 31. Reception filter 12R is a filter having, as a passband, the reception band of B1 (a first communication band). Reception filter 12R has an output terminal connected to selector terminal 32c of switch 32. The output terminal of transmission filter 12T and the input terminal of reception filter 12R are commonly connected to input/output terminal 110.

Note that duplexer 11 and duplexer 12 may constitute a quadplexer.

Power amplifier 41T is one example of the first transmission power amplifier and amplifies, for example, a B1 or B3 transmission signal. Low-noise amplifier 41R amplifies, for example, a B1 or B3 reception signal.

Switch 31 is disposed on transmission paths between power amplifier 41T and transmission filters 11T and 12T, and switches the connection of power amplifier 41T between transmission filter 11T and transmission filter 12T. Switch 31 is, for example, a single pole double throw (SPDT) switch circuit including common terminal 31a and selector terminals 31b and 31c. Common terminal 31a is connected to the output terminal of power amplifier 41T, selector terminal 31b is connected to the input terminal of transmission filter 11T, and selector terminal 31c is connected to the input terminal of transmission filter 12T.

Switch 32 is disposed on reception paths between low-noise amplifier 41R and reception filters 11R and 12R, and switches the connection of low-noise amplifier 41R between reception filter 11R and reception filter 12R. Switch 32 is, for example, an SPDT switch circuit including common terminal 32a and selector terminals 32b and 32c. Common terminal 32a is connected to the input terminal of low-noise amplifier 41R, selector terminal 32b is connected to the output terminal of reception filter 11R, and selector terminal 32c is connected to the output terminal of reception filter 12R.

According to the aforementioned configuration, transfer circuit 70A outputs a B1 or B3 transmission signal (a first transmission signal) amplified by power amplifier 41T from input/output terminal 110 (a first input/output terminal).

Transfer circuit 70B includes input/output terminal 120, duplexer 13, power amplifier 42T, and low-noise amplifier 42R.

Duplexer 13 includes transmission filter 13T and reception filter 13R. Transmission filter 13T is a filter having, as a passband, the transmission band of B7 (a first communication band or second communication band having a transmission band from 2500 MHz to 2570 MHz and a reception band from 2620 MHz to 2690 MHz). Transmission filter 13T has an input terminal connected to the output terminal of power amplifier 42T. Reception filter 13R is a filter having, as a passband, the reception band of B7 (a first communication band or second communication band). Reception filter 13R has an output terminal connected to the input terminal of low-noise amplifier 42R. The output terminal of transmission filter 13T and the input terminal of reception filter 13R are commonly connected to input/output terminal 120.

Power amplifier 42T is one example of the first transmission power amplifier and amplifies, for example, a B7 transmission signal. Low-noise amplifier 42R amplifies, for example, a B7 reception signal.

According to the aforementioned configuration, transfer circuit 70B outputs a B7 transmission signal (a first transmission signal or a second transmission signal) amplified by power amplifier 42T from input/output terminal 120 (a first input/output terminal or a second input/output terminal).

Transfer circuit 70C includes input/output terminal 130, filters 14, 15, and 16, switch 33, power amplifier 43T, and low-noise amplifier 43R.

Filter 14 is a filter having, as a passband, the frequency range of n77 (a second communication band). Filter 14 has one terminal connected to input/output terminal 130 and the other terminal connected to selector terminal 33c of switch 33.

Filter 15 is a filter having, as a passband, the frequency range of n78 (a second communication band). Filter 15 has one terminal connected to input/output terminal 130 and the other terminal connected to selector terminal 33d of switch 33.

Filter 16 is a filter having, as a passband, the frequency range of n79 (a second communication band). Filter 16 has one terminal connected to input/output terminal 130 and the other terminal connected to selector terminal 33e of switch 33.

Note that filter 14, filter 15, and filter 16 may constitute a triplexer.

Power amplifier 43T is one example of the second transmission power amplifier and amplifies, for example, an n77, n78, or n79 transmission signal. Low-noise amplifier 43R amplifies, for example, an n77, n78, or n79 reception signal.

Switch 33 is disposed on signal paths between power amplifier 43T and filters 14 through 16 and between low-noise amplifier 43R and filters 14 through 16, and switches the connection of power amplifier 43T among filters 14 through 16 and the connection of low-noise amplifier 43R among filters 14 through 16. Specifically, switch 33 connects power amplifier 43T to at least one of filter 14, filter 15, or filter 16 according to the communication band of a transmission signal outputted from transfer circuit 70C. Switch 33 also connects low-noise amplifier 43R to at least one of filter 14, filter 15, or filter 16 according to the communication band of a reception signal received by transfer circuit 70C.

Switch 33 is, for example, a double pole three throw (DP3T) switch circuit including common terminals 33a and 33b as well as selector terminals 33c, 33d, and 33e. Common terminal 33a is connected to the output terminal of power amplifier 43T, selector terminal 33b is connected to the input terminal of low-noise amplifier 43R, selector terminal 33c is connected to the other terminal of filter 14, selector terminal 33d is connected to the other terminal of filter 15, and selector terminal 33e is connected to the other terminal of filter 16.

According to the aforementioned configuration, transfer circuit 70C outputs an n77, n78, or n79 transmission signal (a second transmission signal) amplified by power amplifier 43T from input/output terminal 130 (a second input/output terminal).

Switch 10 is one example of the switch circuit and includes antenna connecter terminals 10a (a first antenna connector terminal) and 10b (a second antenna connector terminal), and selector terminals 10c (a first selector terminal), 10d (a first selector terminal or second selector terminal), and 10e (a second selector terminal). Antenna connector terminal 10a is connected to antenna 21 and antenna connector terminal 10b is connected to antenna 22. Selector terminal 10c is connected to input/output terminal 110 of transfer circuit 70A, selector terminal 10d is connected to input/output terminal 120 of transfer circuit 70B, and selector terminal 10e is connected to input/output terminal 130 of transfer circuit 70C. Switch 10 is, for example, a DP3T switch circuit. Switch 10 may be a DPDT or DP4T switch circuit according to the number of transfer circuits included in radio-frequency circuit 1. In other words, the number of selector terminals is not limited to three, that is, selector terminals 10c, 10d, and 10e, and may be two or at least four depending on the number of transfer circuits. Note that it is possible for switch 10 to select one of the following: not connecting antenna connector terminal 10a to any of selector terminals 10c through 10e; and connecting antenna connector terminal 10a to at least one of selector terminal 10c, 10d, or 10e. Moreover, it is also possible for switch 10 to select one of the following: not connecting antenna connector terminal 10b to any of selector terminals 10c through 10e; and connecting antenna connector terminal 10b to at least one of selector terminal 10c, 10d, or 10e. In other words, switch 10 is a multi-connection type switch circuit capable of simultaneously or exclusively executing the connection between antenna connector terminal 10a and selector terminal 10c, 10d, or 10e and the connection between antenna connector terminal 10b and selector terminal 10c, 10d, or 10e.

With the aforementioned configuration, the connection of antenna connector terminal 10a is switched among selector terminals 10c through 10e and the connection of antenna connector terminal 10b is also switched among selector terminals 10c through 10e. In other words, switch 10 either connects antenna 21 to at least one of transfer circuit 70A, 70B, or 70C, or does not connect antenna 21 to any of transfer circuits 70A through 70C, according to a combination of the communication bands of the transmission signals simultaneously transmitted from transfer circuits 70A through 70C. Moreover, switch 10 either connects antenna 22 to at least one of transfer circuit 70A, 70B, or 70C, or does not connect antenna 22 to any of transfer circuits 70A through 70C.

In the state where the first transmission signal of the first communication band, which is transmitted from one of transfer circuits 70A through 70C, and the second transmission signal of the second communication band, which is transmitted from another transfer circuit among transfer circuits 70A through 70C, are simultaneously transmitted, when the frequency of intermodulation distortion between the first transmission signal and the second transmission signal is included in at least one of the first communication band or the second communication band, switch 10 connects antenna 21 to that one transfer circuit and connects antenna 22 to the other transfer circuit.

Power amplifiers 41T, 42T, and 43T as well as low-noise amplifiers 41R, 42R, and 43R each include, for example, a Si-based complementary metal oxide semiconductor (CMOS), or comprise GaAs and include a field effect transistor (FET) or a hetero bipolar transistor (HBT).

In transfer circuit 70A, low-noise amplifier 41R and switches 31 and 32 may be formed in a first semiconductor integrated circuit (IC). Stated differently, low-noise amplifier 41R and switches 31 and 32 may be formed on the same IC substrate and integrated in a single chip. In addition, the first semiconductor IC may further include power amplifier 41T.

In transfer circuit 70B, low-noise amplifier 42R may be formed in a second semiconductor IC. In addition, the second semiconductor IC may further include power amplifier 42T.

In transfer circuit 70C, low-noise amplifier 43R and switch 33 may be formed in a third semiconductor IC. Stated differently, low-noise amplifier 43R and switch 33 may be formed on the same IC substrate and integrated in a single chip. In addition, the third semiconductor IC may further include power amplifier 43T.

The first through third semiconductor ICs each include, for example, a CMOS. Specifically, the first through third semiconductor ICs are each formed by a silicon-on-insulator (SOI) process. This enables manufacturing of the first through third semiconductor ICs with low cost. Note that the first through third semiconductor ICs may each comprise at least one of GaAs, SiGe, or GaN. This enables output of a radio-frequency signal having high-quality amplification performance and noise performance.

Furthermore, the first through third semiconductor ICs may be configured as a single semiconductor IC or may be integrated in a single chip.

The number of communication bands for radio-frequency signals transferred by transfer circuit 70A is not limited to two, that is, B1 and B3, and may be one or at least three. Moreover, the communication bands for radio-frequency signals transferred by transfer circuit 70A are not limited to 4G-LTE communication bands and may be 5G-NR communication bands or the both. Transfer circuit 70A may perform transmission and reception of B1 and B3 radio-frequency signals, using a time division duplex (TDD) scheme instead of a frequency division duplex (FDD) scheme. In this case, a TDD filter and a switch are disposed instead of duplexers 11 and 12.

The number of communication bands for radio-frequency signals transferred by transfer circuit 70B is not limited to one, that is, B7, and may be at least two. Moreover, the communication bands for radio-frequency signals transferred by transfer circuit 70C are not limited to 4G-LTE communication bands and may be 5G-NR communication bands or the both. Transfer circuit 70B may perform transmission and reception of B7 radio-frequency signals, using the TDD scheme instead of the FDD scheme. In this case, a TDD filter and a switch are disposed instead of duplexer 13.

The number of communication bands for radio-frequency signals transferred by transfer circuit 70C is not limited to three, that is, n77, n78, and n79, and may be at most two or at least four. Moreover, the communication bands for radio-frequency signals transferred by transfer circuit 70C are not limited to 4G-LTE communication bands and may be 5G-NR communication bands or the both. Transfer circuit 70C may perform transmission and reception of n77, n78, and n79 radio-frequency signals, using the FDD scheme instead of the TDD scheme.

Although it is defined herein that each of transfer circuits 70A through 70C performs both of transmission and reception, a reception path may be omitted according to a specification required for signal transfer.

The number of transfer circuits included in radio-frequency signal 1 need not be three and may be two or at least four.

According to the aforementioned configuration, radio-frequency circuit 1 is capable of separately performing either transmission and reception of B1 signals or transmission and reception of B3 signals, or simultaneously performing the both. Moreover, radio-frequency circuit 1 is capable of performing the transmission and reception of B7 signals. Radio-frequency circuit 1 is also capable of separately transmitting one of or simultaneously transmitting at least any two of n77, n78, and n79 transmission signals, and separately receiving one of or simultaneously receiving at least any two of n77, n78, and n79 reception signals. Moreover, radio-frequency circuit 1 is capable of simultaneously performing at least two of the following: (1) transmission and reception of B1 signals; (2) transmission and reception of B3 signals; (3) transmission and reception of B7 signals; (4) transmission or reception of n77 signals; (5) transmission or reception of n78 signals; and (6) transmission or reception of n79 signals.

Antenna 21 is one example of the first antenna, is connected to antenna connector terminal 10a, and performs transmission or reception of radio-frequency signals. Antenna 22 is one example of the second antenna, is connected to antenna connector terminal 10b, and performs transmission or reception of radio-frequency signals.

RFIC 5 is an RF signal processing circuit that processes radio-frequency signals. Specifically, RFIC 5 performs, by upconversion, etc., signal processing on a transmission signal input from BBIC 6, and outputs the radio-frequency signal generated through the signal processing to transfer circuits 70A through 70C. RFIC 5 includes a controller that switches the connection states of switches 10, 31, 32 and 33 based on a combination of the communication bands of the radio-frequency signals transferred in radio-frequency circuit 1. Specifically, RFIC 5 outputs, to radio-frequency circuit 1, digital control signals Ctrl1 and Ctrl2 compliant with, for example, Mobile Industry Processor Interface (MIPI) specifications. The connection states of switches 10, 31, 32, and 33 are controlled by such digital control signals Ctrl1 and Ctrl2. Note that the controller may be provided outside RFIC 5 and may be provided in BBIC 6, for example.

BBIC 6 is a circuit that performs signal processing using an intermediate frequency band including a frequency lower than a radio-frequency signal propagating in transfer circuits 70A through 70C. The signal processed by BBIC 6 is, for example, used as an image signal for image display or a sound signal for conversation via a speaker.

Note that BBIC 6 is not an essential element of communication device 7 according to this embodiment.

Figure 2:
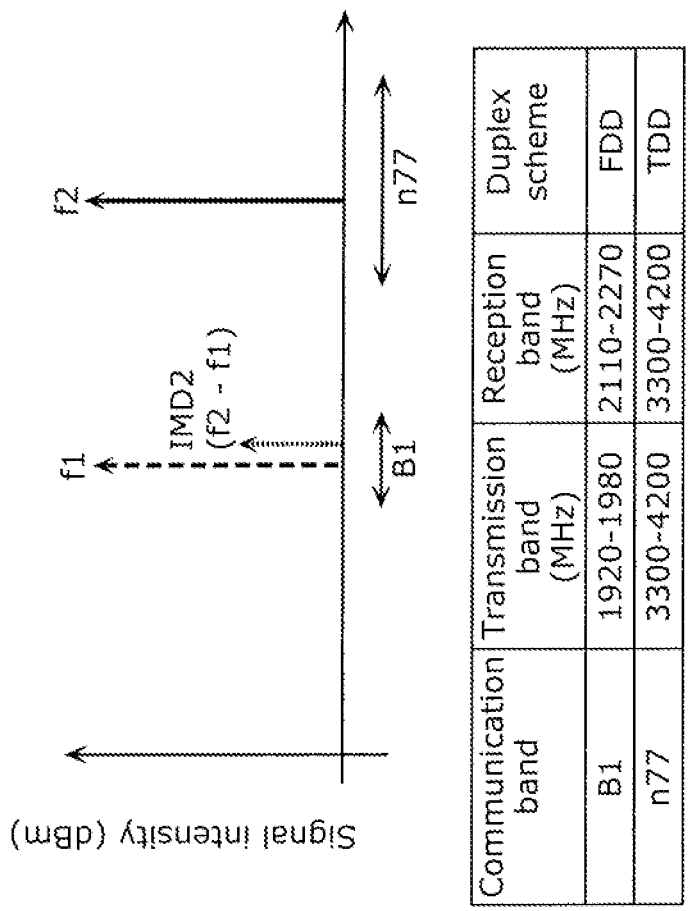
FIG. 2 is an outline diagram representing an example of a frequency relationship between a transmission signal outputted from a first transfer circuit, a transmission signal outputted from a second transfer circuit, and intermodulation distortion.

FIG. 2 is an outline diagram representing an example of a frequency relationship between a transmission signal outputted from one of transfer circuits 70A through 70C, a transmission signal outputted from another one of transfer circuits 70A through 70C, and intermodulation distortion. The figure indicates the generation of second-order intermodulation distortion (f2−f1) in the case where, in radio-frequency circuit 1, transfer circuit 70A transfers a B1 transmission signal (the first frequency f1), and at the same time, transfer circuit 70C transfers an n77 transmission signal (the second frequency f2) (LTE-NR dual connectivity: Evolved-Universal Terrestrial Radio Access Network New Radio-Dual Connectivity (EN-DC)).

In radio-frequency circuit 1, the n77 transmission signal (the second frequency f2) outputted from transfer circuit 70C flows into transfer circuit 70A via input/output terminals 130 and 110. Second-order intermodulation distortion IMD2 (the frequency: f2−f1) is generated in transfer circuit 70A by the n77 transmission signal (the second frequency f2) flowing into transfer circuit 70A and the B1 transmission signal (the first frequency f1) outputted from power amplifier 41T in transfer circuit 70A (also referred to as "reverse IMD2" since the second-order intermodulation distortion is caused by the n77 transmission signal reversely flowing from input/output terminal 110). Due to the frequency relationship between the B1 transmission signal (the first frequency f1) and the n77 transmission signal (the second frequency f2), the frequency of the second-order intermodulation distortion IMD2 is included in the frequency range of B1. In other words, owing to a frequency, which is twice first frequency f1 included in B1, being included in the frequency range of n77, the frequency of the second-order intermodulation distortion IMD2 is included in the frequency range of B1.

It is assumed that for this reason, an unwanted wave which is the above-described second-order intermodulation distortion IMD2 is superimposed on the B1 transmission signal outputted from radio-frequency circuit 1, and in-band spurious emission specification in the third generation partnership project (3GPP) is not satisfied. Moreover, it is also assumed that the unwanted wave generated in the reception band of B1 causes deterioration of reception sensitivity to B1 signals.

However, with radio-frequency circuit 1 according to this embodiment, in the state in which a B1 first transmission signal transmitted from transfer circuit 70A and an n77 second transmission signal transmitted from transfer circuit 70C are simultaneously transmitted, when the frequency of intermodulation distortion IMD2 between the B1 first transmission signal and the n77 second transmission signal is included in the frequency range of B1, switch 10 connects antenna 21 to transfer circuit 70A and connects antenna 22 to transfer circuit 70C.

According to this configuration, transfer circuits 70A and 70C are connected to different antennas 21 and 22 in the state in which the frequency of the intermodulation distortion IMD2 is included in the frequency range of B1 which is a communication band of a radio-frequency signal to be simultaneously transmitted. This enhances isolation between transfer circuits 70A and 70C, and makes it possible to reduce intermodulation distortion IMD2. It is therefore possible to avoid the in-band spurious emission specification in 3GPP being unsatisfied due to an unwanted wave that is the aforementioned intermodulation distortion. Moreover, it is also possible to avoid the deterioration of reception sensitivity to B1 signals, which is caused by the generation of the unwanted wave in the reception band of B1.

Owing to the connection of transfer circuits 70A and 70C to different antennas 21 and 22, it is possible to inhibit a B1 transmission signal outputted from transfer circuit 70C from reaching filter 14 via input/output terminal 110 or 130. A harmonic of the B1 transmission signal outputted from transfer circuit 70A is generated by non-linear behavior exhibited by transfer circuit 70C, due to the B1 transmission signal being output via antenna 21 or 22. It is therefore possible, with the above-described connection, to avoid the in-band spurious emission specification in 3GPP being unsatisfied due to the generation of the harmonic in the transmission band of n77. Moreover, it is also possible to avoid the deterioration of reception sensitivity to n77 signals, which is caused by the generation of the harmonic in the reception band of n77.

In the state in which a B7 first transmission signal transmitted from transfer circuit 70B and an n77 second transmission signal transmitted from transfer circuit 70C are simultaneously transmitted, since the frequency of intermodulation distortion IMD2 between the B7 first transmission signal and the n77 second transmission signal is not included in either of the frequency range of B7 and the frequency range of n77, switch 10 connects antenna 21 to both transfer circuit 70B and transfer circuit 70C.

According to this configuration, when the frequency of intermodulation distortion IMD2 between the B7 (a first communication band) first transmission signal and the n77 (a second communication band) second transmission signal which are simultaneously transmitted is not included in either the frequency range of B7 and the frequency range of n77, transfer circuits 70B and 70C are connected to single antenna 21. This can simplify the adjustment of transmission parameters at the time of transmission since there is no need to individually adjust, for each antenna, the transmission powers of the B7 transmission signal and the n77 transmission signal, for instance.

Note that when the B7 first transmission signal and the n77 second transmission signal are simultaneously transmitted, transfer circuits 70B and 70C may be connected to antenna 22 instead of antenna 21.

When the B7 first transmission signal and the n77 second transmission signal are simultaneously transmitted, transfer circuits 70B and 70C may be connected to an antenna having a higher sensitivity out of antennas 21 and 22.

This enables simultaneous transmissions, with a high efficiency, of the B7 first transmission signal and the n77 second transmission signal.

Note that a coupler may be placed between switch 10 and each of the transfer circuits for determining which of antennas 21 and 22 has a higher sensitivity. This case shows that the smaller a transmission power value measured by a coupler is, the higher the sensitivity of the antenna, which is connected to a transfer circuit provided with the coupler, becomes. Note that RFIC 5 controls the connection of switch 10 based on transmission power values measured by the couplers. Alternatively, as another way to determine superiority in sensitivity, the controller in RFIC 5 may measure the sensitivities of antennas 21 and 22 based on the reception power values of the radio-frequency signals, which are obtained by a reception signal intensity indicator included in RFIC 5.

As described above, radio-frequency circuit 1 and communication device 7 according to the above embodiments are applied to communication systems such as 4G and 5G, and are typically applied to systems for performing simultaneous transmission of a 4G-LTE radio-frequency signal and a 5G-NR radio-frequency signal (EN-DC). In radio-frequency circuit 1, a radio-frequency signal transferred in transfer circuit 70A or 70B is used in 4G and a radio-frequency signal transferred in transfer circuit 70C is used in 5G, for example.

It should be noted that radio-frequency circuit 1 and communication device 7 according to this embodiment are not limitedly applied to the aforementioned EN-DC, and are applied to a system that simultaneously transmits two 4G-LTE radio-frequency signals or a system that simultaneously transmits two 5G-NR radio-frequency signals.

The following can be given as examples of a first communication band/second communication band combination by which second-order or third-order intermodulation distortion is generated either in the first communication band or in the second communication band due to the simultaneous transmission of a transmission signal of the first communication band and a transmission signal of the second communication band: (1) B1 and n77, (2) B3 and n77, (3) B3 and n78, and the like.

Moreover, the following can be given as examples of a first communication band/second communication band combination by which a second-order or third-order intermodulation distortion is generated neither in the first communication band nor in the second communication band: (4) B7 and n77, (5) B1 and n78, (6) B7 and n78, (7) B3 and n78, (8) B1 and n79, (9) B3 and n79, etc.

Furthermore, the first communication band/second communication band combination by which second-order or third-order intermodulation distortion is generated in the first communication band or in the second communication band due to the simultaneous transmission of a transmission signal of the first communication band and a transmission signal of the second communication band is not limited to the aforementioned combinations (1) through (3), and any of the combinations shown in Table 1 can be employed as well.

Note that radio-frequency circuit 1 and communication device 7 according to this embodiment may be applied, in addition to 4G and 5G, to communication systems such as a wireless local area network (WLAN) using a frequency band with the lower limit of 5 GHz. In radio-frequency circuit 1 in this case, a radio-frequency signal transferred in transfer circuit 70A or 70B is used in the 4G or 5G, and a radio-frequency signal transferred in transfer circuit 70C is used in the WLAN, for example.

The second communication band may be, for example, a WLAN having a frequency band from 6.525 GHz to 7.125 GHz, and the first communication band may be any one of 4G-LTE B42, 4G-LTE B48, 5G-NR n48, 5G-NR n77, or 5G-NR n78. In this case, switch 10 connects selector terminal 10c to antenna connector terminal 10a and selector terminal 10e to antenna connector terminal 10b in the simultaneous transmission of the first transmission signal and the second transmission signal.

When the first communication band/second communication band combination is one of the aforementioned combinations, the frequency of intermodulation distortion IMD2 is included in the first communication band. Therefore, in such a case, connecting transfer circuits 70A and 70C to different antennas enhances isolation between transfer circuit 70A and transfer circuit 70C. This can reduce second-order intermodulation distortion IMD2.

The second communication band may be, for example, a WLAN having a frequency band from 5.15 GHz to 6.525 GHz and the first communication band may be any one of 4G-LTE B42, 4G-LTE B48, 5G-NR n48, 5G-NR n77, or 5G-NR n78. In this case, switch 10 connects both of selector terminals 10c and 10e to one of antenna connector terminals 10a or 10b in the simultaneous transmission of the first transmission signal and the second transmission signal.

When the first communication band/second communication band combination is one of the aforementioned combinations, the frequency of intermodulation distortion IMD2 is not included in either of the first communication band and the second communication band. Therefore, in such a case, connecting transfer circuits 70A and 70C to the same antenna does not require individual adjustment, for each antenna, of the transmission powers of the first transmission signal and the second transmission signal, for instance. This can therefore simplify the adjustment of transmission parameters at the time of transmission.

The second communication band may be, for example, a WLAN having a frequency band from 5.15 GHz to 5.35 GHz and the first communication band may be one of 4G-LTE B41 and 5G-NR n41. In this case, switch 10 connects selector terminal 10c to antenna connector terminal 10a and selector terminal 10e to antenna connector terminal 10b in the simultaneous transmission of the first transmission signal and the second transmission signal.

When the first communication band/second communication band combination is one of the aforementioned combinations, the frequency of intermodulation distortion IMD2 is included in the first communication band. Therefore, in this case, connecting transfer circuits 70A and 70C to different antennas enhances isolation between transfer circuit 70A and transfer circuit 70C. This can reduce second-order intermodulation distortion IMD2.

The second communication band may be, for example, a WLAN having a frequency band from 5.47 GHz to 7.125 GHz and the first communication band may be one of 4G-LTE B41 or 5G-NR n41. In this case, switch 10 connects both of selector terminals 10c and 10e to one of antenna connector terminals 10a or 10b in the simultaneous transmission of the first transmission signal and the second transmission signal.

When the first communication band/second communication band combination is one of the aforementioned combinations, the frequency of intermodulation distortion IMD2 is not included in either of the first communication band and the second communication band. Therefore, in such a case, connecting transfer circuits 70A and 70C to the same antenna does not require individual adjustment, for each antenna, of the transmission powers of the first transmission signal and the second transmission signal, for instance. This can therefore simplify the adjustment of transmission parameters at the time of transmission.

Figure 3:
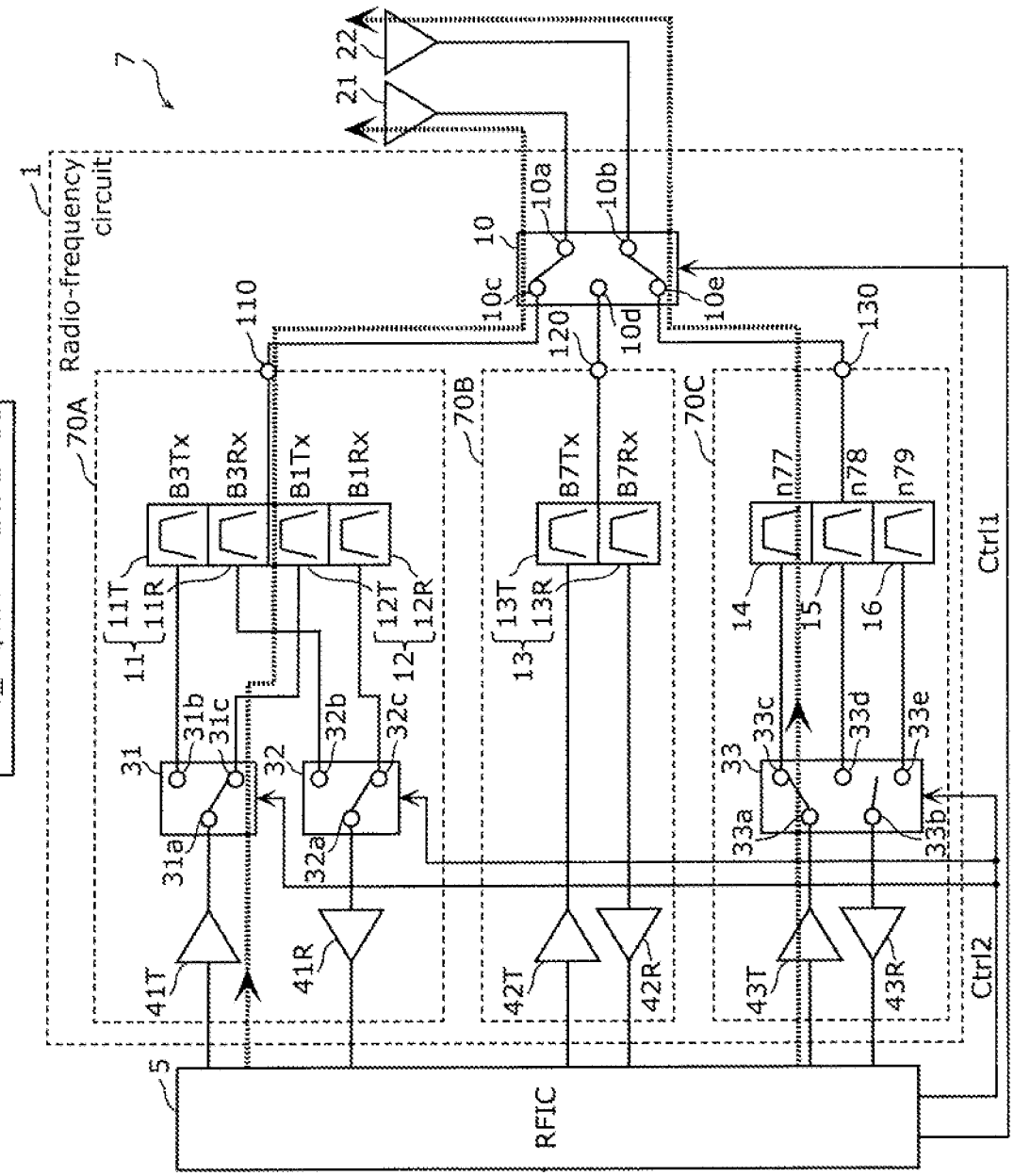
FIG. 3 is an example of a circuit diagram illustrating a state of signal transfer of a radio-frequency circuit according to Implemental Example 1.

As illustrated in FIG. 3, common terminal 31a and selector terminal 31c of switch 31 are connected to each other in transfer circuit 70A. Antenna connector terminal 10a and selector terminal 10c of switch 10 are connected to each other. With this configuration, a transmission path for transferring a B1 first transmission signal from RFIC 5 to power amplifier 41T to switch 31 to transmission filter 12T to input/output terminal 110 to switch 10 and to antenna 21

TABLE 1

| | First communication band (Tx1, Rx1) | Third communication band (Tx2, Rx2) | IMD2 Tx2-Tx1 (MHz) | IMD3 2Tx2-Tx1 (MHz) | Band overlapped by IMD |
|---|---|---|---|---|---|
| Ex. 1 | B1 | n77 | yes | | B1-Tx |
| Ex. 2 | B2 | B(n)66 | | yes | B(n)66-Tx |
| Ex. 3 | B2 | n78 | yes | | B2-Tx |
| Ex. 4 | B3 | n77 | yes | | B3-Tx |
| Ex. 5 | B3 | n78 | yes | | B3-Tx |
| Ex. 6 | B8 | n78 | yes | | n78 |
| Ex. 7 | B18 | n77 | yes | | n77 |
| Ex. 8 | B19 | n77 | yes | | n77 |
| Ex. 9 | B20 | n8 | | yes | B20-Tx n8-Tx |
| Ex. 10 | B20 | n77 | yes | | n77 |
| Ex. 11 | B26 | n77 | yes | | n77 |
| Ex. 12 | B28 | n51 | yes | | B28-Tx |
| Ex. 13 | B28 | n77 | yes | | n77 |
| Ex. 14 | B39 | n78 | yes | | B39 |
| Ex. 15 | B41 | n79 | yes | | B41 |
| Ex. 16 | B66 | n78 | yes | | B66-Tx |
| Ex. 17 | n77 3.3-4.2 GHz | WLAN 6.525-7.125 GHz | yes | | n77 3.3-4.2 GHz |
| Ex. 18 | n78 3.3-3.8 GHz | WLAN 6.525-7.125 GHz | yes | | n78 3.3-3.8 GHz |
| Ex. 19 | B42 3.4-3.6 GHz | WLAN 6.525-7.125 GHz | yes | | B42 3.4-3.6 GHz |
| Ex. 20 | B48 (n48) 3.55-3.7 GHz | WLAN 6.875-7.125 GHz | yes | | B48 (n48) 3.55-3.7 GHz |
| Ex. 21 | B41 (n41) 2.5-2.69 GHz | WLAN 5.15-5.35 GHz | yes | | B41 (n41) 2.5-2.69 GHz |

The first communication band/second communication band combinations shown in Table 1 are also applicable to radio-frequency circuit 1 and communication device 7 according to this embodiment. The combinations shown in Table 1 are each a combination by which second-order or third-order intermodulation distortion is generated in either the first communication band or the second communication band. Accordingly, when a first transmission signal of the first communication band and a second transmission signal of the second communication band are simultaneously transmitted, switch 10 connects the first transfer circuit that transfers the first transmission signal and the second transfer circuit that transfers the second transmission signal to different antennas. This can effectively reduce in-band spurious emission or the deterioration of reception sensitivity due to second-order intermodulation distortion IMD2 or third-order intermodulation distortion generated when the first transmission signal and the second transmission signal are simultaneously transmitted.

2. State of Circuit Connection of Radio-Frequency Circuit 1 According to Implemental Example 1: Simultaneous Transmission of a B1 Transmission Signal and a n77 Transmission Signal FIG. 3 is a circuit diagram illustrating a state of signal transfer of radio-frequency circuit 1 according to Implemental Example 1. The figure illustrates the circuit state of radio-frequency circuit 1 when a B1 first transmission signal is outputted from transfer circuit 70A, and at the same time, an n77 second transmission signal is outputted from transfer circuit 70C.

is formed. Moreover, common terminal 32a and selector terminal 32c of switch 32 are connected to each other. With this configuration, a reception path for transferring a B1 first reception signal from antenna 21 to switch 10 to input/output terminal 110 to reception filter 12R to switch 32 to low-noise amplifier 41R and to RFIC 5 is formed.

As illustrated in FIG. 3, common terminal 33a and selector terminal 33c of switch 33 are connected to each other in transfer circuit 70C. Antenna connector terminal 10b and selector terminal 10e of switch 10 are connected to each other. With this configuration, a transmission path for transferring an n77 second transmission signal from RFIC 5 to power amplifier 43T to switch 33 to filter 14 to input/output terminal 130 to switch 10 and to antenna 22 is formed.

Owing to the aforementioned connection state, radio-frequency circuit 1 simultaneously transmits a B1 first transmission signal and an n77 second transmission signal, and also receives a B1 first reception signal at the same time.

According to this configuration, although the frequency of second-order intermodulation distortion IMD2 (the frequency: f2-f1) generated by the n77 second transmission signal (the second frequency f2) and the B1 first transmission signal (the first frequency f1) is included in the transmission band of B1, transfer circuit 70A that outputs a first transmission signal and transfer circuit 70C that outputs a second transmission signal are connected to different antennas 21 and 22, respectively. This enhances isolation between transfer circuit 70A and transfer circuit 70C, and makes it possible to reduce intermodulation distortion IMD2. It is therefore possible to avoid the in-band spurious emission specification in 3GPP being unsatisfied due to an unwanted wave which is the above-described intermodulation distortion. Moreover, it is also possible to avoid the deterioration of reception sensitivity to B1 signals, which is caused by the generation of the unwanted wave in the reception band of B1.

Figure 4:
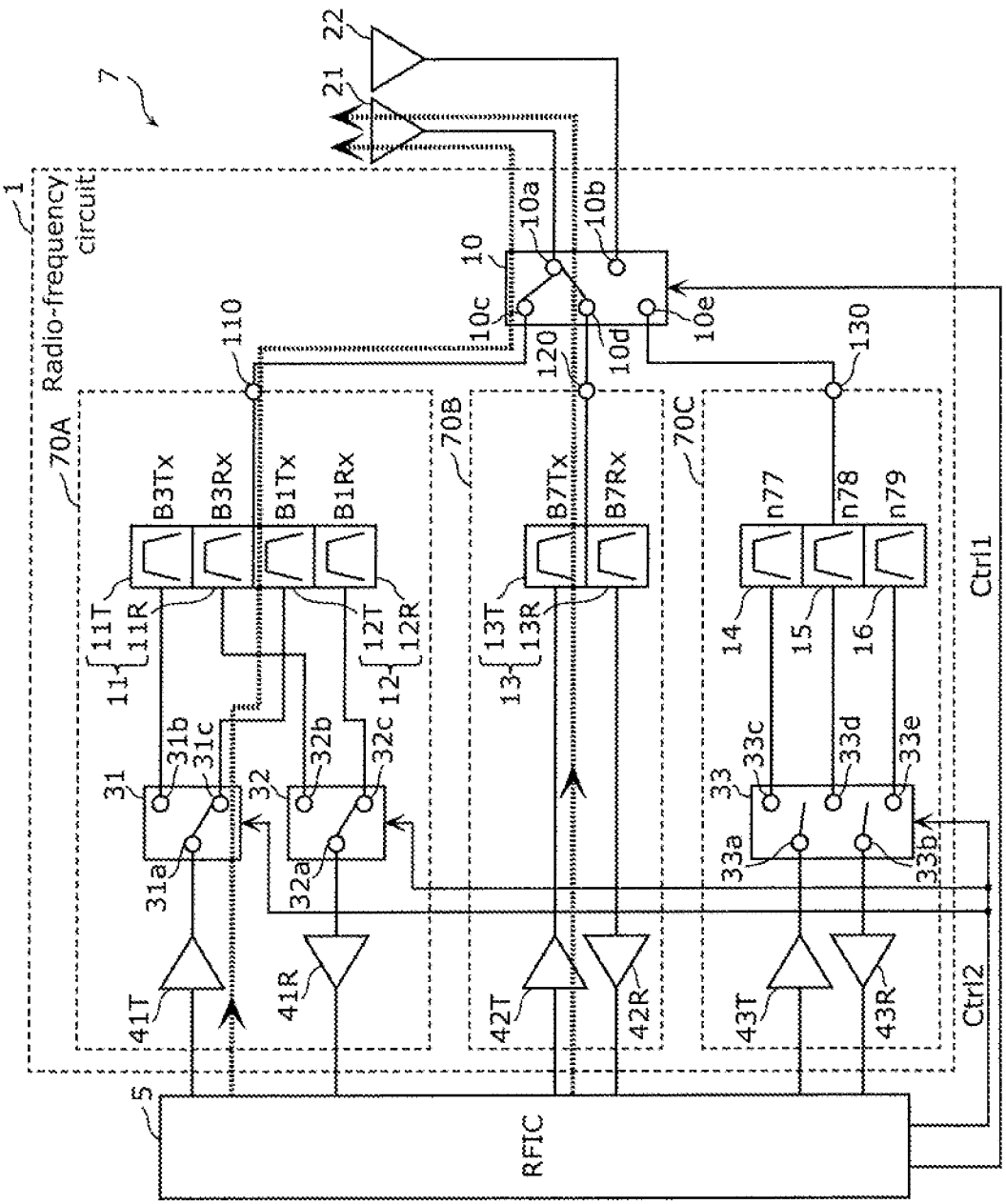
FIG. 4 is an example of a circuit diagram illustrating a state of signal transfer of a radio-frequency circuit according to Implemental Example 2.

3. State of Circuit Connection of Radio-Frequency Circuit 1 According to Implemental Example 2: Simultaneous Transmission of a B1 Transmission Signal and a B7 Transmission Signal FIG. 4 is an example of a circuit diagram illustrating a state of signal transfer of radio-frequency circuit 1 according to Implemental Example 2. The figure illustrates the circuit state of radio-frequency circuit 1 when a B1 first transmission signal is outputted from transfer circuit 70A, and at the same time, a B7 second transmission signal is outputted from transfer circuit 70B.

As illustrated in FIG. 4, common terminal 31a and selector terminal 31c of switch 31 are connected to each other in transfer circuit 70A. Antenna connector terminal 10a and selector terminal 10c of switch 10 are connected to each other. With this, a transmission path for transferring a B1 first transmission signal from RFIC 5 to power amplifier 41T to switch 31 to transmission filter 12T to input/output terminal 110 to switch 10 and to antenna 21 is formed. Moreover, common terminal 32a and selector terminal 32c of switch 32 are connected to each other. With this configuration, a reception path for transferring a B1 first reception signal from antenna 21 to switch 10 to input/output terminal 110 to reception filter 12R to switch 32 to low-noise amplifier 41R and to RFIC 5 is formed.

As illustrated in FIG. 4, antenna connector terminal 10a and selector terminal 10d of switch 10 are connected to each other. With this configuration, a transmission path for transferring a B7 second transmission signal from RFIC 5 to power amplifier 42T to transmission filter 13T to input/output terminal 120 to switch 10 and to antenna 21 is formed. Moreover, a reception path for transferring a B7 second reception signal from antenna 21 to switch 10 to input/output terminal 120 to reception filter 13R to low-noise amplifier 42R and to RFIC 5 is formed.

Owing to the aforementioned connection state, radio-frequency circuit 1 simultaneously transmits a B1 first transmission signal and a B7 second transmission signal, and also receives a B1 first reception signal and a B7 second reception signal at the same time.

According to this configuration, the frequency of second-order intermodulation distortion IMD2 generated by the B7 second transmission signal (the second frequency f2) and the B1 first transmission signal (the first frequency f1) is not included in either of the frequency range of B1 and the frequency range of B7. Accordingly, transfer circuit 70A that outputs a first transmission signal and transfer circuit 70B that outputs a second transmission signal are connected to the same antenna 21 in this case. This can simplify the adjustment of transmission parameters at the time of transmission since there is no need to individually adjust, for each antenna, the transmission powers of the B1 transmission signal and the B7 transmission signal, for instance.

In this case, transfer circuits 70A and 70B may be connected to an antenna having higher sensitivity out of antennas 21 and 22. This enables simultaneous transmission, with a high efficiency, of a B1 first transmission signal and a B7 second transmission signal.

Figure 5:
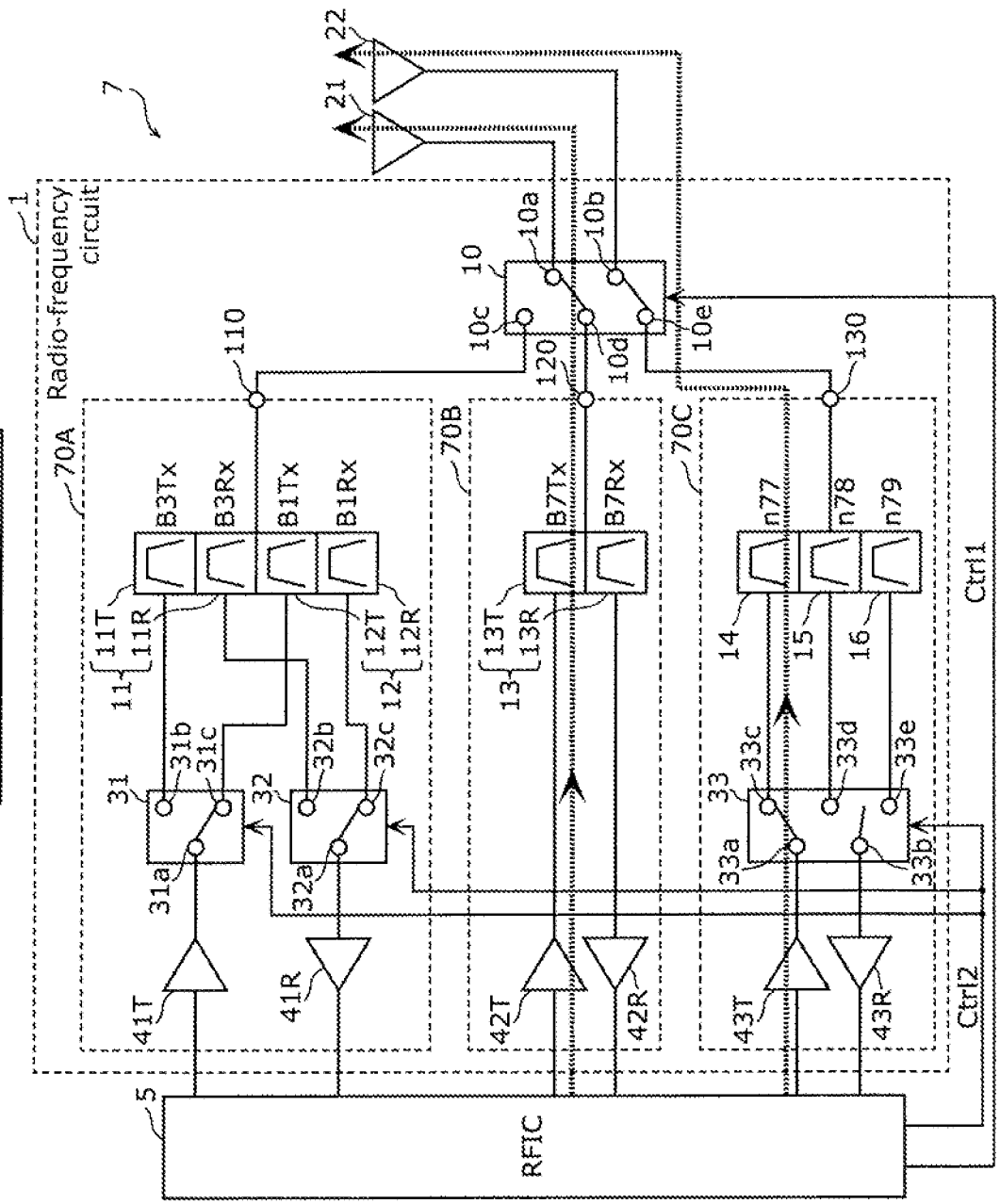
FIG. 5 is an example of a circuit diagram illustrating a state of signal transfer of a radio-frequency circuit according to Implemental Example 3.

4. State of Circuit Connection of Radio-Frequency Circuit 1 According to Implemental Example 3: Simultaneous Transmission of a B7 Transmission Signal and an n77 Transmission Signal FIG. 5 is an example of a circuit diagram illustrating a state of signal transfer of radio-frequency circuit 1 according to Implemental Example 3. The figure illustrates the circuit state of radio-frequency circuit 1 when a B7 first transmission signal is outputted from transfer circuit 70B, and at the same time, an n77 second transmission signal is outputted from transfer circuit 70C.

As illustrated in FIG. 5, antenna connector terminal 10a and selector terminal 10d of switch 10 are connected to each other. With this configuration, a transmission path for transferring a B7 first transmission signal from RFIC 5 to power amplifier 42T to transmission filter 13T to input/output terminal 120 to switch 10 and to antenna 21 is formed. Moreover, a reception path for transferring a B7 first reception signal from antenna 21 to switch 10 to input/output terminal 120 to reception filter 13R to low-noise amplifier 42R and to RFIC 5 is formed.

As illustrated in FIG. 5, common terminal 33a and selector terminal 33c of switch 33 are connected to each other in transfer circuit 70C. Antenna connector terminal 10b and selector terminal 10e of switch 10 are connected to each other. With this configuration, a transmission path for transferring an n77 second transmission signal from RFIC 5 to power amplifier 43T to switch 33 to filter 14 to input/output terminal 130 to switch 10 and to antenna 22 is formed.

Owing to the aforementioned connection state, radio-frequency circuit 1 simultaneously transmits a B7 first transmission signal and an n77 second transmission signal, and also receives a B7 first reception signal at the same time.

According to this configuration, the frequency of second-order intermodulation distortion between a 4G radio-frequency signal (e.g., the B7 first transmission signal) and a 5G radio-frequency signal (e.g., the n77 second transmission signal) is not included in either of the transmission band of B7 and the band of n77. Even in such a case, transfer circuit 70B and transfer circuit 70C are connected to different antennas 21 and 22. Since it is assumed that a 4G radio-frequency signal and a 5G radio-frequency signal that are transmitted by communication device 7 are received at different base stations, it is necessary to individually adjust the transmission powers of a first transmission signal and a second transmission signal, for instance. Accordingly, it is possible in such a case to enhance communication accuracy for the first transmission signal and the second transmission signal in EN-DC.

5. State of Circuit Connection of Radio-Frequency Circuit 1 According to Implemental Example 4: Simultaneous Transmission of a B3 Transmission Signal, a B7 Transmission Signal, and an n78 Transmission Signal Radio-frequency signal 1 according to the above embodiments is not limitedly applied to the case of simultaneously transmitting two transmission signals and is also applicable to the case of simultaneously transmitting three or more transmission signals.

FIG. 6 is an example of a circuit diagram illustrating a state of signal transfer of radio-frequency circuit 1 according to Implemental Example 4. FIG. 6 illustrates the circuit state of radio-frequency circuit 1 when a B3 transmission signal is outputted from transfer circuit 70A, a B7 transmission signal is outputted from transfer circuit 70B, and an n78 transmission signal is outputted from transfer circuit 70C, all at the same time.

As illustrated in FIG. 6, common terminal 31a and selector terminal 31b of switch 31 are connected to each other in transfer circuit 70A. Antenna connector terminal 10a and selector terminal 10c of switch 10 are connected to each other. With this, a transmission path for transferring a B3 transmission signal from RFIC 5 to power amplifier 41T to switch 31 to transmission filter 11T to input/output terminal 110 to switch 10 and to antenna 21 is formed. Moreover, common terminal 32a and selector terminal 32b of switch 32 are connected to each other. With this, a reception path for transferring a B3 reception signal from antenna 21 to switch 10 to input/output terminal 110 to reception filter 11R to switch 32 to low-noise amplifier 41R and to RFIC 5 is formed.

As illustrated in FIG. 6, antenna connector terminal 10a and selector terminal 10d of switch 10 are connected to each other. With this configuration, a transmission path for transferring a B7 transmission signal from RFIC 5 to power amplifier 42T to transmission filter 13T to input/output terminal 120 to switch 10 and to antenna 21 is formed. Moreover, a reception path for transferring a B7 reception signal from antenna 21 to switch 10 to input/output terminal 120 to reception filter 13R to low-noise amplifier 42R and to RFIC 5 is formed.

As illustrated in FIG. 6, common terminal 33a and selector terminal 33d of switch 33 are connected to each other in transfer circuit 70C. Antenna connector terminal 10b and selector terminal 10e of switch 10 are connected to each other. With this configuration, a transmission path for transferring an n78 transmission signal from RFIC 5 to power amplifier 43T to switch 33 to filter 15 to input/output terminal 130 to switch 10 and to antenna 22 is formed.

Owing to the aforementioned connection state, radio-frequency circuit 1 simultaneously transmits a B3 transmission signal, a B7 transmission signal, and an n78 transmission signal, and also receives a B3 reception signal and a B7 reception signal at the same time.

According to this configuration, although the frequency of second-order intermodulation distortion IMD2 (the frequency: f2−f1) generated by the n78 transmission signal (the second frequency f2) and the B3 transmission signal (the first frequency f1) is included in the transmission band of B3, transfer circuit 70A that outputs the B3 transmission signal and transfer circuit 70C that outputs the n78 transmission signal are connected to different antennas 21 and 22. This enhances isolation between transfer circuit 70A and transfer circuit 70C, and makes it possible to reduce intermodulation distortion IMD2. It is therefore possible to avoid the in-band spurious emission specification in 3GPP being unsatisfied due to an unwanted wave which is the above-described intermodulation distortion. Moreover, it is also possible to avoid the deterioration of reception sensitivity to B3 signals, which is caused by the generation of the unwanted wave in the reception band of B3.

Moreover, the frequency of second-order intermodulation distortion IMD2 generated by the B7 transmission signal (the second frequency f2) and the B3 transmission signal (the first frequency f1) is included in none of the frequency ranges of B3, B7, and n78. Accordingly, in this case, transfer circuit 70A that outputs the B3 transmission signal and transfer circuit 70B that outputs the B7 transmission signal are connected to the same antenna 21. This can simplify the adjustment of transmission parameters at the time of transmission since there is no need to individually adjust, for each antenna, the transmission powers of the B3 transmission signal and the B7 transmission signal, for instance.

As described above, radio-frequency circuit 1 according to this embodiment includes: transfer circuit 70A that includes power amplifier 41T and is configured to output a first transmission signal amplified by power amplifier 41T from first input/output terminal 110, power amplifier 41T being configured to amplify a transmission signal of a first communication band (e.g., B1 or B3); transfer circuit 70C that includes power amplifier 43T and is configured to output a second transmission signal amplified by power amplifier 43T from input/output terminal 130, power amplifier 43T being configured to amplify a transmission signal of a second communication band (e.g., n77, n78, or n79) having a frequency range that does not overlap a frequency range of the first communication band; and switch 10 including antenna connector terminal 10a connected to antenna 21, antenna connector terminal 10b connected to antenna 22, selector terminal 10c connected to input/output terminal 110, and selector terminal 10e connected to input/output terminal 130. When a first communication band/second communication band combination is such that the frequency of intermodulation distortion in simultaneous transmission of the first transmission signal and the second transmission signal is included in at least one of the first communication band or the second communication band, switch 10 is configured to connect selector terminal 10c to antenna connector terminal 10a and connect selector terminal 10e to antenna connector terminal 10b. When a first communication band/second communication band combination is such that the frequency of the intermodulation distortion is not included in either of the first communication band and the second communication band, switch 10 is configured to connect both of selector terminal 10c and selector terminal 10e to antenna connector terminal 10a.

According to this, when the frequency of the intermodulation distortion is included in at least one of the first communication band or the second communication band, transfer circuit 70A and transfer circuit 70C are connected to different antennas. This enhances isolation between transfer circuit 70A and transfer circuit 70C, and makes it possible to reduce the intermodulation distortion. It is therefore possible to avoid the in-band spurious emission specification in 3GPP being unsatisfied due to an unwanted wave which is the above-described intermodulation distortion. Moreover, it is also possible to avoid the deterioration of reception sensitivity to the transmission signals of the first communication band or the second communication band, which is caused by the generation of the unwanted wave in the reception band of that communication band. Furthermore, when the frequency of the intermodulation distortion is not included in either of the first communication band and the second communication band, transfer circuit 70A and transfer circuit 70C are connected to the same antenna. This can simplify the adjustment of transmission parameters at the time of transmission since there is no need to individually adjust, for each antenna, the transmission powers of the first transmission signal and the second transmission signal, for instance.

When both of selector terminals 10c and 10e are connected to antenna connector terminal 10a, antenna connector terminal 10a may be connected to antenna 21 having higher sensitivity out of antennas 21 and 22.

According to this configuration, when the frequency of the intermodulation distortion is not included in either of the first communication band and the second communication band, transfer circuit 70A and transfer circuit 70C are connected to the same antenna having high sensitivity. This enables simultaneous transmission, with high efficiency, of the first transmission signal and the second transmission signal.

The second communication band may be n77 of 5G-NR, the first communication band may be Band 1, Band 3, Band 66, or Band 41 of 4G-LTE, and switch 10 may be configured to connect connector terminal 10c to antenna connector terminal 10a and connect selector terminal 10e to antenna connector terminal 10b in the simultaneous transmission of the first transmission signal and the second transmission signal.

The second communication band may be n78 of 5G-NR, the first communication band may be Band 3 or Band 66 of 4G-LTE, and switch 10 may be configured to connect selector terminal 10c to antenna connector terminal 10a and connect selector terminal 10e to antenna connector terminal 10b in the simultaneous transmission of the first transmission signal and the second transmission signal.

With the first communication band/second communication band combination as described above, the frequency of intermodulation distortion IMD2 is included in the first communication band. Accordingly, in this case, connecting transfer circuit 70A and transfer circuit 70C to different antennas enhances isolation between transfer circuit 70A and transfer circuit 70C. This can reduce second-order intermodulation distortion IMD2. It is therefore possible to avoid the in-band spurious emission specification in 3GPP being unsatisfied due to an unwanted wave which is the above-described intermodulation distortion. Moreover, it is also possible to avoid the deterioration of reception sensitivity to the transmission signals of the first communication band, which is caused by the generation of the unwanted wave in the reception band of the first communication band.

The second communication band may be Band 2 or Band 25 of 4G-LTE, the first communication band may be n66 of 5G-NR, and switch 10 may be configured to connect selector terminal 10c to antenna connector terminal 10a and connect selector terminal 10e to antenna connector terminal 10b in the simultaneous transmission of the first transmission signal and the second transmission signal.

With the first communication band/second communication band combination as described above, the frequency of third-order intermodulation distortion IMD3 is included in the first communication band. Accordingly, in this case, connecting transfer circuit 70A and transfer circuit 70C to different antennas enhances isolation between transfer circuit 70A and transfer circuit 70C. This can reduce third-order intermodulation distortion IMD3. It is therefore possible to avoid the in-band spurious emission specification in 3GPP being unsatisfied due to an unwanted wave which is the above-described intermodulation distortion. Moreover, it is also possible to avoid the deterioration of reception sensitivity to the transmission signals of the first communication band, which is caused by the generation of the unwanted wave in the reception band of the first communication band.

The second communication band may be 5G-NR n77, the first communication band may be 4G-LTE Band 7 or Band 40, and switch 10 may be configured to connect both of selector terminal 10d and selector terminal 10e to antenna connector terminal 10a in the simultaneous transmission of the first transmission signal (outputted from transfer circuit 70B) and the second transmission signal (outputted from transfer circuit 70C).

The second communication band may be 5G-NR n78, the first communication band may be 4G-LTE Band 1, Band 2, Band 7, Band 40, or Band 41, and switch 10 may be configured to connect both of selector terminal 10c and selector terminal 10e to antenna connector terminal 10a in the simultaneous transmission of the first transmission signal (outputted from transfer circuit 70A) and the second transmission signal (outputted from transfer circuit 70C).

The second communication band may be 5G-NR n79, the first communication band may be 4G-LTE Band 41, and switch 10 may be configured to connect selector terminal 10c to antenna connector terminal 10a and connect selector terminal 10e to antenna connector terminal 10b in the simultaneous transmission of the first transmission signal and the second transmission signal.

The second communication band may be a WLAN having a frequency band from 6.525 GHz to 7.125 GHz. The first communication band may be one of 4G-LTE Band 42, 4G-LTE Band 48, 5G-NR n48, 5G-NR n77, and 5G-NR n78. Switch 10 may be configured to connect selector terminal 10c to antenna connector terminal 10a and connect selector terminal 10e to antenna connector terminal 10b in the simultaneous transmission of the first transmission signal and the second transmission signal.

The second communication band may be a WLAN having a frequency band from 5.15 GHz to 6.525 GHz. The first communication band may be one of 4G-LTE Band 42, 4G-LTE Band 48, 5G-NR n48, 5G-NR n77, and 5G-NR n78. Switch 10 may be configured to connect both of selector terminal 10c and selector terminal 10e to one of antenna connector terminal 10a and antenna connector terminal 10b in the simultaneous transmission of the first transmission signal and the second transmission signal.

The second communication band may be a WLAN having a frequency band from 5.15 GHz to 5.35 GHz. The first communication band is one of 4G-LTE Band 41 and 5G-NR n41. Switch 10 is configured to connect selector terminal 10c to antenna connector terminal 10a and connect selector terminal 10e to antenna connector terminal 10b in the simultaneous transmission of the first transmission signal and the second transmission signal.

The second communication band may be a WLAN having a frequency band from 5.47 GHz to 7.125 GHz. The first communication band may be one of 4G-LTE Band 41 and 5G-NR n41. Switch 10 may be configured to connect both of selector terminal 10c and selector terminal 10e to one of antenna connector terminal 10a and antenna connector terminal 10b in the simultaneous transmission of the first transmission signal and the second transmission signal.

The second communication band may be 5G-NR n79, the first communication band may be 4G-LTE Band 1, Band 3, Band 40, or Band 66, and switch 10 may be configured to connect both of selector terminal 10c and selector terminal 10e to antenna connector terminal 10a in the simultaneous transmission of the first transmission signal (outputted from transfer circuit 70A) and the second transmission signal (outputted from transfer circuit 70C).

When one of the first communication band/second communication band combinations as described above is employed, the frequency of second-order intermodulation distortion IMD2 or third-order intermodulation distortion IMD3 is not included in either of the first communication band and the second communication band. Accordingly, in this case, connecting transfer circuit 70A (or transfer circuit 70B) and transfer circuit 70C to the same antenna 21 can simplify the adjustment of transmission parameters at the time of transmission since there is no need to individually adjust, for each antenna, the transmission powers of the first transmission signal and the second transmission signal, for instance.

In the case where a radio-frequency signal of the first communication band is used in 4G and a radio-frequency signal of the second communication band is used in 5G, when the frequency of intermodulation distortion between the first transmission signal (outputted from transfer circuit 70A) and the second transmission signal (outputted from transfer circuit 70C) is not included in either of the first communication band and the second communication band in the simultaneous transmission of the first transmission signal and the second transmission signal, switch 10 may be configured to connect selector terminal 10c to antenna connector terminal 10a and connect selector terminal 10e to antenna connector terminal 10b.

According to this configuration, even when the frequency of intermodulation distortion between a 4G radio-frequency signal and a 5G radio-frequency signal is not included in either of the first communication band and the second communication band, two transfer circuits are connected to different antennas. Since it is assumed that a 4G first transmission signal and a 5G second transmission signal are received at different base stations, it is necessary to individually adjust the transmission powers of the first transmission signal and the second transmission signal. Accordingly, it is possible to enhance communication accuracy for the first transmission signal and the second transmission signal in EN-DC.

Radio-frequency circuit 1 according to this embodiment includes: a transfer circuit (transfer circuit 70A, transfer circuit 70B, or transfer circuit 70C) including input/output terminal 110 (a first input/output terminal) through which a first transmission signal of B1 (a first communication band) is output, input/output terminal 130 (a second input/output terminal) through which a second transmission signal of n77 (a second communication band) is output, and input/output terminal 120 (a third input/output terminal) through which a third transmission signal of B7 (a third communication band) is output, n77 having a frequency range that does not overlap the frequency range of B1, B7 having a frequency range that overlaps neither the frequency range of B1 nor the frequency range of n77; and switch 10 including antenna connector terminal 10a connected to antenna 21, antenna connector terminal 10b connected to antenna 22 different from antenna 21, selector terminal 10c connected to input/output terminal 110, selector terminal 10d connected to input/output terminal 120, and selector terminal 10e connected to input/output terminal 130. A frequency of intermodulation distortion between the B1 first transmission signal and the n77 second transmission signal is included in the frequency range of B1. A frequency of intermodulation distortion between the B1 first transmission signal and the B7 third transmission signal is not included in either of the frequency range of B1 and the frequency range of B7. Switch 10 is configured to: connect selector terminal 10c to antenna connector terminal 10a and connect selector terminal 10e to antenna connector terminal 10b when the B1 first transmission signal and the n77 second transmission signal are simultaneously transmitted; and connect both of selector terminal 10c and selector terminal 10d to antenna connector terminal 10a when the B1 first transmission signal and the B7 third transmission signal are simultaneously transmitted.

According to this configuration, since the frequency of the intermodulation distortion between the first transmission signal and the second transmission signal is included in at least one of the first communication band or the second communication band, input/output terminal 110 and input/output terminal 130 are connected to different antennas. This enhances isolation between the first transmission signal and the second transmission signal, and makes it possible to reduce the intermodulation distortion. It is therefore possible to avoid the in-band spurious emission specification in 3GPP being unsatisfied due to an unwanted wave which is the above-described intermodulation distortion. Moreover, it is also possible to avoid the deterioration of reception sensitivity to the transmission signals of the first communication band or the second communication band, which is caused by the generation of the unwanted wave in the reception band of that communication band. Furthermore, since the frequency of the intermodulation distortion between the first transmission signal and the third transmission signal is not included in either of the first communication band and the third communication band, input/output terminal 110 and input/output terminal 120 are connected to the same antenna. This can simplify the adjustment of transmission parameters at the time of transmission since there is no need to individually adjust, for each antenna, the transmission powers of the first transmission signal and the third transmission signal, for instance.

Communication device 7 according to this embodiment includes: antenna 21; antenna 22; RFIC 5 configured to process a radio-frequency signal transmitted or received by antenna 21 and a radio-frequency signal transmitted or received by antenna 22; and radio-frequency circuit 1 configured to (i) transfer, between antenna 21 and RFIC 5, the radio-frequency signal transmitted or received by antenna 21 and (ii) transfer, between antenna 22 and RFIC 5, the radio-frequency signal transmitted or received by antenna 22.

With this configuration, it is possible to provide a communication device capable of avoiding the in-band spurious emission specification in 3GPP being unsatisfied due to an unwanted wave which is intermodulation distortion generated by the first transmission signal and the second transmission signal or a communication device capable of avoiding the deterioration of reception sensitivity to the transmission signals of the first communication band or the second communication band, which is caused by the generation of the unwanted wave in the reception band of that communication band.

Other Embodiments

Although the radio-frequency circuit and the communication device according to the present disclosure have been described above based on an exemplary embodiment and implemental examples thereof, the radio-frequency circuit and the communication device according to the present disclosure are not limited to the foregoing embodiment and implemental examples thereof. The present invention also encompasses other embodiments achieved by combining arbitrary elements in the above embodiment and implemental examples thereof, variations resulting from various modifications to the embodiment and implemental examples thereof that may be conceived by those skilled in the art without departing from the essence of the present disclosure, and various devices that include the radio-frequency circuit and the communication device according to the embodiment and implemental examples thereof.

For example, radio-frequency circuit 1 according to the present disclosure may include: transfer circuit 70A that includes power amplifier 41T and is configured to output a first transmission signal amplified by power amplifier 41T from input/output terminal 110, power amplifier 41T being configured to amplify a transmission signal of a first communication band; transfer circuit 70C configured to transfer a reception signal of a second communication band having a frequency range that does not overlap a frequency range of the first communication band; and switch 10 including antenna connector terminal 10a connected to antenna 21, antenna connector terminal 10b connected to antenna 22 different from antenna 21, selector terminal 10c connected to input/output terminal 110, and selector terminal 10e connected to input/output terminal 130. When a frequency of a second harmonic of the first transmission signal is included in a reception band of the second communication band, switch 10 may be configured to connect selector terminal 10c to antenna connector terminal 10a and connect selector terminal 10e to antenna connector terminal 10b. When the frequency of the second harmonic of the first transmission signal is not included in the reception band of the second communication band, switch 10 may be configured to connect both of selector terminal 10c and selector terminal 10e to antenna connector terminal 10a.

According to this configuration, when the frequency of the second harmonic of the first transmission signal is included in the reception band of the second communication band, transfer circuit 70A and transfer circuit 70C are connected to different antennas. This enhances isolation between transfer circuit 70A and transfer circuit 70C, and makes it possible to inhibit the second harmonic of the first transmission signal from entering the reception path of transfer circuit 70C. It is therefore possible to reduce the deterioration of reception sensitivity of transfer circuit 70C. Moreover, when the frequency of the second harmonic of the first transmission signal is not included in the reception band of the second communication band, transfer circuit 70A and transfer circuit 70C are connected to the same antenna. This can simplify the adjustment of transmission parameters at the time of transmission since there is no need to individually adjust, for each antenna, the transmission powers of the first transmission signal and the second transmission signal, for instance.

For example, when the second communication band is a WLAN having a band around 6.6 GHz and the first communication band is n78 of 5G-NR, switch 10 connects selector terminal 10c to antenna connector terminal 10a and connects selector terminal 10e to antenna connector terminal 10b.

For example, in the radio-frequency circuit and the communication device according to each of the foregoing embodiment and implemental examples thereof, another radio-frequency circuit element or wire may be inserted between a circuit element and a signal path or between signal paths, or in a path connecting circuit elements in each of the circuit configuration diagrams disclosed.

Furthermore, the controller according to the present disclosure may be implemented with an integrated circuit (IC) or large scale integration (LSI). The method of implementation of structural elements using an integrated circuit may be implemented using a dedicated circuit or a general-purpose processor. A field programmable gate array (FPGA) that allows for programming after the manufacture of an LSI, or a reconfigurable processor that allows for reconfiguration of the connection and the setting of circuit cells inside an LSI may be employed. When circuit integration technology that replaces LSIs comes along owing to advances of the semiconductor technology or to a separate derivative technology, the function blocks may understandably be integrated using that technology.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely used in communication apparatuses such as a mobile phone, as a radio-frequency circuit and a communication device that simultaneously transmit two or more radio-frequency signals having frequencies that do not overlap each other.

What is claimed is:

1. A radio-frequency circuit, comprising:
a first transfer circuit that includes a first transmission power amplifier and is configured to output a first transmission signal amplified by the first transmission power amplifier from a first input/output terminal, the first transmission power amplifier being configured to amplify a transmission signal of a first communication band;
a second transfer circuit that includes a second transmission power amplifier and is configured to output a second transmission signal amplified by the second transmission power amplifier from a second input/output terminal, the second transmission power amplifier being configured to amplify a transmission signal of a second communication band having a frequency range that does not overlap a frequency range of the first communication band; and
a switch circuit including a first antenna connector terminal connected to a first antenna, a second antenna connector terminal connected to a second antenna different from the first antenna, a first selector terminal connected to the first input/output terminal, and a second selector terminal connected to the second input/output terminal, wherein
when a frequency of intermodulation distortion in simultaneous transmission of the first transmission signal and the second transmission signal is included in at least one of the first communication band or the second communication band, the switch circuit is configured to connect the first selector terminal to the first antenna connector terminal and connect the second selector terminal to the second antenna connector terminal, and
when the frequency of the intermodulation distortion is not included in either of the first communication band and the second communication band, the switch circuit is configured to connect both of the first selector terminal and the second selector terminal to one of the first antenna connector terminal or the second antenna connector terminal.

2. The radio-frequency circuit according to claim 1, wherein
the one of the first antenna connector terminal or the second antenna connector terminal is connected to an antenna having a higher sensitivity out of the first antenna and the second antenna.

3. The radio-frequency circuit according to claim 1, wherein
the second communication band is n77 of a fifth generation mobile communication system (5G)-new radio (NR), and the first communication band is Band 1, Band 3, Band 66, or Band 41 of a fourth generation mobile communication system (4G)-long term evolution (LTE), and the switch circuit is configured to connect the first selector terminal to the first antenna connector terminal and connect the second selector terminal to the second antenna connector terminal in the simultaneous transmission of the first transmission signal and the second transmission signal.

4. The radio-frequency circuit according to claim 1, wherein
the second communication band is n77 of a fifth generation mobile communication system (5G)-new radio (NR),
the first communication band is Band 7 or Band 40 of a fourth generation mobile communication system (4G)-long term evolution (LTE), and
the switch circuit is configured to connect both of the first selector terminal and the second selector terminal to one of the first antenna connector terminal and the second antenna connector terminal in the simultaneous transmission of the first transmission signal and the second transmission signal.

5. The radio-frequency circuit according to claim 1, wherein
the second communication band is n78 of a fifth generation mobile communication system (5G)-new radio (NR) and the first communication band is Band 3 or Band 66 of a fourth generation mobile communication system (4G)-long term evolution (LTE), and
the switch circuit is configured to connect the first selector terminal to the first antenna connector terminal and connect the second selector terminal to the second antenna connector terminal in the simultaneous transmission of the first transmission signal and the second transmission signal.

6. The radio-frequency circuit according to claim 1, wherein
the second communication band is n78 of a fifth generation mobile communication system (5G)-new radio (NR),
the first communication band is Band 1, Band 2, Band 7, Band 40, or Band 41 of a fourth generation mobile communication system (4G)-long term evolution (LTE), and
the switch circuit is configured to connect both of the first selector terminal and the second selector terminal to one of the first antenna connector terminal and the second antenna connector terminal in the simultaneous transmission of the first transmission signal and the second transmission signal.

7. The radio-frequency circuit according to claim 1, wherein
the second communication band is n79 of a fifth generation mobile communication system (5G)-new radio (NR) and the first communication band is Band 41 of a fourth generation mobile communication system (4G)-long term evolution (LTE), and
the switch circuit is configured to connect the first selector terminal to the first antenna connector terminal and connect the second selector terminal to the second antenna connector terminal in the simultaneous transmission of the first transmission signal and the second transmission signal.

8. The radio-frequency circuit according to claim 1, wherein
the second communication band is a wireless local area network (WLAN) having a frequency band of from 6.525 GHz to 7.125 GHz,
the first communication band is one of Band 42 of a fourth generation mobile communication system (4G)-long term evolution (LTE), Band 48 of the 4G-LTE, n48 of a fifth generation mobile communication system (5G)-new radio (NR), n77 of the 5G-NR, or n78 of the 5G-NR, and
the switch circuit is configured to connect the first selector terminal to the first antenna connector terminal and connect the second selector terminal to the second antenna connector terminal in the simultaneous transmission of the first transmission signal and the second transmission signal.

9. The radio-frequency circuit according to claim 1, wherein
the second communication band is a wireless local area network (WLAN) having a frequency band of from 5.15 GHz to 6.525 GHz,
the first communication band is one of Band 42 of a fourth generation mobile communication system (4G)-long term evolution (LTE), Band 48 of the 4G-LTE, n48 of a fifth generation mobile communication system (5G)-new radio (NR), n77 of the 5G-NR, or n78 of the 5G-NR, and
the switch circuit is configured to connect both of the first selector terminal and the second selector terminal to one of the first antenna connector terminal or the second antenna connector terminal in the simultaneous transmission of the first transmission signal and the second transmission signal.

10. The radio-frequency circuit according to claim 1, wherein
the second communication band is a wireless local area network (WLAN) having a frequency band of from 5.15 GHz to 5.35 GHz,
the first communication band is one of Band 41 of a fourth generation mobile communication system (4G)-long term evolution (LTE) or n41 of a fifth generation mobile communication system (5G)-new radio (NR), and
the switch circuit is configured to connect the first selector terminal to the first antenna connector terminal and connect the second selector terminal to the second antenna connector terminal in the simultaneous transmission of the first transmission signal and the second transmission signal.

11. The radio-frequency circuit according to claim 1, wherein
the second communication band is a wireless local area network (WLAN) having a frequency band of from 5.47 GHz to 7.125 GHz,
the first communication band is one of Band 41 of a fourth generation mobile communication system (4G)-long term evolution (LTE) or n41 of a fifth generation mobile communication system (5G)-new radio (NR), and
the switch circuit is configured to connect both of the first selector terminal and the second selector terminal to one of the first antenna connector terminal or the second antenna connector terminal in the simultaneous transmission of the first transmission signal and the second transmission signal.

12. The radio-frequency circuit according to claim 1, wherein
the second communication band is n79 of a fifth generation mobile communication system (5G)-new radio (NR), the first communication band is Band 1, Band 3, Band 40, or Band 66 of a fourth generation mobile communication system (4G)-long term evolution (LTE), and the switch circuit is configured to connect both of the first selector terminal and the second selector terminal to one of the first antenna connector terminal or the second antenna connector terminal in the simultaneous transmission of the first transmission signal and the second transmission signal.

13. The radio-frequency circuit according to claim 1, wherein the second communication band is Band 2 or Band 25 of a fourth generation mobile communication system (4G)-long term evolution (LTE), and the first communication band is n66 of a fifth generation mobile communication system (5G)-new radio (NR), and the switch circuit is configured to connect the first selector terminal to the first antenna connector terminal and connect the second selector terminal to the second antenna connector terminal in the simultaneous transmission of the first transmission signal and the second transmission signal.

14. The radio-frequency circuit according to claim 1, wherein in a case where the first communication band and the second communication band are both used in a fourth generation mobile communication system (4G) or in a fifth generation mobile communication system (5G):

when the frequency of the intermodulation distortion is included in at least one of the first communication band or the second communication band, the switch circuit is configured to connect the first selector terminal to the first antenna connector terminal and connect the second selector terminal to the second antenna connector terminal; and when the frequency of the intermodulation distortion is not included in either of the first communication band or the second communication band, the switch circuit is configured to connect both of the first selector terminal and the second selector terminal to one of the first antenna connector terminal or the second antenna connector terminal, and in a case where the first communication band is used in the 4G and the second communication band is used in the 5G, when the frequency of the intermodulation distortion is not included in either of the first communication band and the second communication band, the switch circuit is configured to connect the first selector terminal to the first antenna connector terminal and connect the second selector terminal to the second antenna connector terminal.

15. The radio-frequency circuit according to claim 1, wherein in a case where the first communication band and the second communication band are both used in a fourth generation mobile communication system (4G) or in a fifth generation mobile communication system (5G):

when the frequency of the intermodulation distortion is included in at least one of the first communication band or the second communication band, the switch circuit is configured to connect the first selector terminal to the first antenna connector terminal and connect the second selector terminal to the second antenna connector terminal; and when the frequency of the intermodulation distortion is not included in either of the first communication band or the second communication band, the switch circuit is configured to connect both of the first selector terminal and the second selector terminal to one of the first antenna connector terminal and the second antenna connector terminal, and in a case where the first communication band is used in the 4G or in the 5G, and the second communication band is one of a wireless local area network (WLAN) having a frequency band of from 5.15 GHz to 5.35 GHz, a WLAN having a frequency band of from 6.525 GHz to 7.125 GHz, or a WLAN having a frequency band of from 6.875 GHz to 7.125 GHz, when the frequency of the intermodulation distortion is not included in either of the first communication band or the second communication band, the switch circuit is configured to connect the first selector terminal to the first antenna connector terminal and connect the second selector terminal to the second antenna connector terminal.

16. A radio-frequency circuit, comprising:

a first transfer circuit that includes a first transmission power amplifier and is configured to output a first transmission signal amplified by the first transmission power amplifier from a first input/output terminal, the first transmission power amplifier being configured to amplify a transmission signal of a first communication band;

a second transfer circuit configured to transfer a reception signal of a second communication band having a frequency range that does not overlap a frequency range of the first communication band; and a switch circuit including a first antenna connector terminal connected to a first antenna, a second antenna connector terminal connected to a second antenna different from the first antenna, a first selector terminal connected to the first input/output terminal, and a second selector terminal connected to a second input/output terminal, wherein when a frequency of a second harmonic of the first transmission signal is included in a reception band of the second communication band, the switch circuit is configured to connect the first selector terminal to the first antenna connector terminal and connect the second selector terminal to the second antenna connector terminal, and when the frequency of the second harmonic of the first transmission signal is not included in the reception band of the second communication band, the switch circuit is configured to connect both of the first selector terminal and the second selector terminal to one of the first antenna connector terminal or the second antenna connector terminal.

17. A radio-frequency circuit, comprising:

a transfer circuit including a first input/output terminal through which a first transmission signal of a first communication band is outputted, a second input/output terminal through which a second transmission signal of a second communication band is outputted, and a third input/output terminal through which a third transmission signal of a third communication band is outputted, the second communication band having a frequency range that does not overlap a frequency range of the first communication band, the third communication band having a frequency range that overlaps neither the frequency range of the first communication band nor the frequency range of the second communication band; and a switch circuit including a first antenna connector terminal connected to a first antenna, a second antenna connector terminal connected to a second antenna different from the first antenna, a first selector terminal connected to the first input/output terminal, a second selector terminal connected to the second input/output terminal, and a third selector terminal connected to the third input/output terminal, wherein a frequency of intermodulation distortion between the first transmission signal and the second transmission signal is included in at least one of the first communication band or the second communication band, a frequency of intermodulation distortion between the first transmission signal and the third transmission signal is not included in either of the first communication band or the third communication band, and the switch circuit is configured to:
  connect the first selector terminal to the first antenna connector terminal and connect the second selector terminal to the second antenna connector terminal when the first transmission signal and the second transmission signal are simultaneously transmitted; and
  connect both of the first selector terminal and the third selector terminal to one of the first antenna connector terminal or the second antenna connector terminal when the first transmission signal and the third transmission signal are simultaneously transmitted.

18. A communication device, comprising:
the radio-frequency circuit according to claim 1;
the first antenna;
the second antenna; and
a radio frequency (RF) signal processing circuit configured to process a radio-frequency signal transmitted or received by the first antenna and a radio-frequency signal transmitted or received by the second antenna, wherein the radio-frequency circuit is configured to (i) transfer, between the first antenna and the RF signal processing circuit, the radio-frequency signal transmitted or received by the first antenna and (ii) transfer, between the second antenna and the RF signal processing circuit, the radio-frequency signal transmitted or received by the second antenna.

* * * * *